United States Patent [19]
Johannson

[11] 4,076,845
[45] Feb. 28, 1978

[54] PROCESS FOR USING A POWDERED GLUTEN COMPOSITION IN BAKING

[75] Inventor: Harold P. Johannson, London, Canada

[73] Assignee: Industrial Grain Products, Limited, Montreal, Canada

[21] Appl. No.: 679,077

[22] Filed: Apr. 21, 1976

Related U.S. Application Data

[63] Continuation-in-part of Ser. No. 549,274, Feb. 12, 1975, abandoned.

[51] Int. Cl.² .......................... A21D 2/26; A23J 3/00
[52] U.S. Cl. ................................ 426/19; 260/112 G; 426/271; 426/653; 426/656
[58] Field of Search ................ 426/19, 271, 653, 656, 426/463, 464, 465, 473, 496; 260/112 G

[56] References Cited

U.S. PATENT DOCUMENTS

| 2,797,212 | 6/1957 | Miley et al. ...................... 426/653 X |
| 3,154,420 | 10/1964 | Ponte et al. ............................ 426/19 |
| 3,362,829 | 1/1968 | Landfried et al. .......... 260/112 G X |
| 3,880,824 | 4/1975 | Rao et al. ........................ 260/112 G |

FOREIGN PATENT DOCUMENTS

| 1,070,114 | 12/1959 | Germany. |
| 1,117,087 | 11/1968 | Germany. |

OTHER PUBLICATIONS

Chemical Abstracts, vol. 55, 24866(f-h), 1961.
Bottle et al., "Turbidity of Wheat Gluten Solutions: Interaction with Phosphate Ions," *Chemistry & Industry*, (Dec. 10, 1960), pp. 1530–1531.
Merck Index, 8th Edition, p. 191.

*Primary Examiner*—Arthur L. Corbin
*Attorney, Agent, or Firm*—Virgil H. Marsh

[57] ABSTRACT

A dry powder composition comprising vital gluten modified by reaction with a non-toxic chelating agent, for example, sodium citrate. This product has improved hydration and development properties and may be used to advantage in many baking applications, especially short time baking processes.

5 Claims, No Drawings

PROCESS FOR USING A POWDERED GLUTEN COMPOSITION IN BAKING

This is a continuation-in-part of U.S. Ser. No. 549,274, filed on Feb. 12, 1975, which is now abandoned.

BACKGROUND OF THE INVENTION

This invention relates broadly to a novel gluten product, processes for obtaining same and uses thereof. More particularly, this invention is concerned with a vital wheat gluten product which has improved functionality, processes for producing same and its utilization in making different products especially, though not exclusively, yeast leavened bakery products.

DESCRIPTION OF THE PRIOR ART

Vital wheat gluten (sometimes referred to hereinafter for convenience simply as "gluten") is a concentrated natural protein in the form of a light tan powder having a bland taste and aroma. It usually contains 75 to 80 percent protein, 5 to 8 percent lipids and related compounds, some fiber, residual starch, a small amount of mineral matter and between 4 and 10 percent residual moisture. It is usually insoluble in neutral aqueous solutions, i.e., those having a pH of from about 4 to about 8. For commercial purposes vital wheat gluten is presently manufactured by one of several washing processes in which wheat flour is kneaded with water to separate the starch and water soluble materials from the gluten components. This gluten forms a tough, rubber elastic mass containing a high proportion of water. This water must be removed rapidly without exposing the gluten to excessively high temperatures since gluten, being a protein, can be denatured by exposure to high temperatures when in the wet state. Two drying processes are in common usage, one involving spray-drying and the other flash-drying.

Vital wheat gluten is an increasingly important product of commerce, being especially widely used today in the manufacture of yeast-leavened bakery products, such as bread, rolls and buns. It is used in other food applications such as pasta-type products like macaroni and also in dietary wafers. It also finds use in alternative applications, such as a binder in canned pet food.

In the bakery application referred to above, especially when making bread, the gluten serves two basic purposes: (1) it supplements or fortifies, i.e., augments, the indigenous protein content of the flour used, and (2) it improves the properties of the finished bread, such as increased loaf volume; in expanded white bread it provides stronger side walls; it improves the bread's keeping properties, i.e., it functions as an anti-staling additive.

To provide the advantages referred to in the immediatey above paragraph, the additional protein content provided by the addition of gluten must become hydrated in order to enter and become incorporated into the protein network formed in the dough during the baking process by the indigenous protein in the flour. This object is achieved in classical baking processes where a relatively long fermentation period of from 4 to 6 hours is used — this amount of time being essential if sufficient hydration and thereby protein functionality is to be achieved. However, in the widely used modern "short time" baking processes, such as chemical dough development (CDD), Chorleywood, and continuous mix processes, this fermentation period is drastically reduced, these processes being completed within about 2 hours. It has been found that while added gluten may be dispersed throughout the dough in such processes a major part thereof does not enter into the basic protein (gluten) network: it is merely converted into a globular or particulate form and the blob or particles are merely lodged between the chains of the network of indigenous gluten protein. Heretofore, therefore, it has not been possible to fully utilize the advantages which might be gained by including vital wheat gluten in applications such as the manufacture of yeast-leavened bakery products. Full obtention of the possible advantages is hindered partly on account of the fact that gluten is not free-flowing or readily dispersible when added to an aqueous medium and a dispersion once obtained is not very stable. A major factor, however, is that the gluten particles do not hydrate easily, rapidly or sufficiently and therefore have a tendency to lump and agglomerate and consequently do not become fully developed. It is believed that this characteristic of slow hydration can be attributed to the fact that powdered gluten is highly hydrophilic so that upon initial wetting it hydrates rapidly to form discrete lumps consisting of a dough-like outer wall which resists further moisture penetration, and capsulating a core of essentially dry unaltered powdered gluten at the center. These lumps can be smoothed out and broken up but vigorous agitation is required for this purpose. Moreover, the disintegration of the lumps and dispersal of the particles is accompanied by the wetting of individual gluten particles which, because of significant inter-molecular forces, exhibit cohesion so that they tend to coalesce subsequent to which they can be separated only by the exertion of considerable disruptive forces. This tendency of the gluten particles to coalesce is greatly increased compared to a dispersion of particles of a material such as a cereal flour or rice since, in these materials, the presence of a major amount of non-protein material, especially starch, seems to be greatly beneficial in maintaining the wet particles separated. Accordingly, a dispersion of ordinary powdered gluten once obtained is markedly unstable because of this tendency of the individual gluten particles to coalesce. Whatever the theoretical explanation, it is a fact that simple mixing of vital wheat gluten with water produces a lumpy product which on vigorous agitation is transformed into a highly intractable rubbery elastic mass.

Various attempts have been made to provide an activated form of gluten which would hydrate sufficiently, easily and relatively rapidly, i.e., in the time period of the modern baking processes, and thereby become available for incorporation into the protein network with all the attendant advantages referred to above. In essence, prior practice has included intimately incorporating or coating the powdered gluten with an amount of certain selected materials; for example, Canadian Pat. No. 793,779 utilizes lipids. Lipids which have been used for this purpose include non-ionic hydrophilic lipids such as monoglycerides and edible salts of lactylic esters of fatty acids which provide a protective barrier or surface layer serving to reduce coalescence between particles of the so treated gluten. At the present time a gluten coated with such a hydrophilic lipid, believed to be the monoglyceride, glyceryl monostearate, is commercially available. This material is effective to the extent that the hydrophilic lipids alleviate to a marked degree the cohesion problem so that the treated gluten tends to form a stable dispersion. However, it is found that the thus-treated gluten is of relatively poor wettability so that on being admixed with water it does not disperse readily but instead tends to form a lumpy mass requiring vigorous agitation to disperse the individual gluten particles. Also, this material tends to be expensive since a fairly substantial amount (typically around 20 percent) of the relatively expensive lipid material needs to be applied in a carefully controlled process, this obviously adding materially to the costs involved. This is a considerable deterrent to its wide-spread adoption by, for instance, the commercial baker who operates in a markedly cost conscious and highly competitive industry. This is further aggravated by the fact that the presence of a substantial amount of an extraneous material reduces the effective amount of gluten per unit weight of product, the component of primary interest to the baker.

There have been attempts to solve the problem of hydration of the gluten not by modifying the gluten but by adjusting the hydrating conditions. For example, Canadian Pat. No. 774,061 discloses a process in which hydration of gluten is effected by extremely high speed cutting of the vital unmodified gluten in the presence of water. As the above shows, these processes have not achieved the desired results.

A principal object of the present invention is to provide a dry modified gluten product which hydrates rapidly under normal mixing conditions.

Another object of the present invention is to provide a novel gluten product which, when included in normal baking processes, hydrates and rapidly becomes developed under normal mixing conditions.

A further object of the present invention is to provide a modified gluten product which is able to absorb or take up more water than the prior art dry gluten products.

Yet a further object of the present invention is to provide a dry modified gluten which when rehydrated is equal to, or even superior in, functionality to rehydrated dry vital gluten or fresh wet gluten.

A further object of the present invention is to provide a dry modified gluten which may replace prior art gluten products to advantage especially in applications, such short time baking processes, where rapid rehydration is essential.

Still a further object is to provide improvements in methods of making yeast leavened bakery products using the dry gluten product of the present invention.

STATEMENT OF INVENTION

It was found, and this finding forms the basis of the present invention, that washing of a dough with a medium containing a chelating agent resulted in a product which met the above objects. Moreover, the very desirable properties are brought about by a residual amount of the chelating agent remaining in the gluten after the treatment.

According to one aspect of the present invention there is provided a powdered composition comprising vital gluten modified by reaction with a non-toxic chelating agent.

The actual constitution of the modified gluten of the present invention is not fully known and while not being bound by any specific theories, it is believed, based on the evidence presently available, that there is a definite chemical or other interaction of the gluten components with the chelating agent with the formation of a gluten-chelating agent compound or complex. This interaction may be due to the chelating agent sequestering calcium and/or magnesium ions thereby altering or modifying the interaction usually existing between the gluten components. As will be shown hereinafter, the product of the present invention is not obtained if simple dry blending or wet blending of the gluten and chelating agent is effected if certain conditions are not adhered to. Moreover, it is known that vital gluten has an acetic acid insoluble fraction of at most 15 percent by weight whereas the complex of the present invention has an acetic acid insoluble fraction of over 30 percent by weight. This unexpected and surprising finding not only forms a basis for assuming chemical or other interaction as indicated above, but is very significant since there are indications that there is a direct correlation between the amount of such insoluble protein material and advantageous baking properties (see R. Orth and W. Bushuk, Cereal Chem. 49, 268-275 (1972)). In any event, the gluten-chelating agent complex of the present invention provides material advantages over prior art gluten products including normal vital gluten itself as well as commercially available modified glutens.

The gluten-chelating agent complex of the present invention is usually a pale yellow powder having a moisture content of less than 10 percent, generally less than 8 percent, and usually between 4 to 6 percent, or even as low as 2 percent by weight.

The chelating agent content of the complex may vary but is generally not more than 5 percent, and usually is between 0.5 and 3 percent, or 1 and 3 percent, by weight based on the dry gluten content. The most practical, and therefore preferred range is considered to be between 0.5, especially 1.25 and 2 percent by weight, based on the dry gluten content; the most preferred concentration being about 1.5 percent by weight, based on the dry gluten content.

Many different chelating agents may be used according to the present invention, an overriding consideration being that, since the product is to be utilized as a foodstuff, they must be non-toxic when complexed with the gluten.

The following are examples of chelating agents which may be used according to the present invention: their being placed in two groups is purely for convenience in further describing the present invention hereinafter.

Group I

1. Ethylenediaminetetraacetic acid, preferably in the form of the disodium salt;
2. Phytates, such as sodium and calcium phytate;
3a. Simple phosphates such as ammonium phosphate, alkali metal, e.g., sodium and potassium phosphates and alkaline earth calcium phosphates;
3b. Complex phosphates or molecularly dehydrated phosphates such as salts of pyrophosphoric acid, e.g., disodium pyrophosphate, polyphosphoric acid, e.g., sodium tripolyphosphate, and metaphosphoric acid, e.g., sodium hexametaphosphate.

Group II

Citrates, such as alkali metal citrates, for example, sodium citrate and potassium citrate and ammonia citrate.

In a further aspect, the present invention provides a process for the production of a powdered modified gluten which process comprises mixing vital gluten and a chelating agent at the effective pH thereof in the presence of water until a substantially homogeneous mixture is obtained, drying the mixture and reducing the dried mixture to a powder form.

The pH extent during the mixing step is extremely important. For the desired product to be obtained the mixing of the gluten and the chelating must be at the effective pH of the specific chelation agent being used. The effective pH is the pH, or a range of pH values, at which the agent functions as a chelating agent. A man skilled in the art will be aware of the effective pH associated with a specific chelating agent or can easily determine same using simple tests.

The actual value of the effective pH is very important from a practical or commercial point of view and may well decide if a particular chelating agent is used or not. As can be readily appreciated, many chelating agents which may be used according to the present invention are effective at a pH of about 8–10. Examples of such agents are those of Group I infra. However, the pH of gluten is about 6 and when using such agents, it is necessary to adjust the pH of the mixture of gluten and chelating agent prior to their being reacted. This pH adjustment may be effected with any suitable non-toxic base such as sodium hydroxide and ammonium hydroxide. However, it must be borne in mind that the majority of dough formulations in association with which the product of the present invention will most probably be used also have a pH of about 6 and therefore after formation of the desired product the base must be neutralized. For this reason ammonium hydroxide is preferably used to adjust the pH of the mixture since upon drying the mixture after formation of the complex, the ammonia is removed automatically. If a base such as sodium hydroxide is used, an acid (such as hydrochloric acid) must be used to reduce the pH after the mixing is complete and this results in the formation of a salt (such as sodium chloride) in the product and this may be undesirable for many applications.

However, certain chelating agents such as those of Group II infra, and of particular interest are citrates such as sodium and potassium citrate, have an effective pH of about 6, i.e., substantially the same as gluten itself. It has been found that no adjustment of the pH of the mixture of gluten and such chelating agent is therefore necessary in order to obtain or induce reaction between the two components and, inter alia, for this reason, gluten complexes with such chelating agents and especially gluten-citrate complexes constitute a preferred form of the present invention.

Moreover, as stated previously, the pH of most freshly mixed doughs is also about 6 and therefore, whilst the pH of products using Group I chelating agents must be readjusted to about said dough pH, products formed using Group II chelating agents need no such pH adjustment and are preferred for that reason also.

The actual mode of mixing of the components of the complex is not considered critical but should be continued for a period sufficient to produce a homogeneous mixture. Since dry vital gluten takes up about twice its own weight of water, the amount thereof present in the reaction mixture should be sufficient to fulfil that requirement. However, an excess should be avoided since this gives no advantages yet necessitates extra drying at a later stage.

The specific method used to dry the wet complex is also not considered critical, the controlling factor being that the mixture should not be heated excessively since denaturing of the protein may occur.

The above is also true of the mechanical reduction process, such as grinding employed, i.e., care should be taken to avoid excessive heating.

The production of the complex according to a process aspect of the present invention may be effected with dry vital gluten and chelating agent in the presence of separately added water. However, it is preferred that the water requirement of the process is provided by using wet gluten since such material is readily available from the wheat flour washing processes referred to previously. When fresh wet gluten is used directly from the starch separator in this manner, not only is a complete, and not inexpensive, gluten drying step eliminated but the wet gluten already contains sufficient water to fulfil all requirements for its reaction with the chelating agent.

Additionally, the performance in baking processes of some of the products of the present invention may be further improved if calcium and/or magnesium ions, say in the form of salts such as calcium chloride or magnesium chloride are included along with the other dough ingredients. The reason for this is not fully clear but it is thought that some of the chelating agents which may be used according to the present invention, in particular, phosphates and EDTA, remove such ions from the dough mixture, which extraction is detrimental to the working of the dough. This has been found in practice to be akin to working with water which is too soft. As competent bakers are aware, such water does not produce acceptable bread.

Further, although all the products according to the present invention function adequately as bread additives, i.e., are compatible with the other dough components, it has been found that some such products, in particular those utilizing Group I chelating agents, when incorporated into a baking dough, may cause the dough to toughen up over a period of time. This toughening of the dough may, to follow the above analogy, be considered to correspond to the use of water which is too hard which, as is well known, also does not produce good bread (although for different reasons). Therefore, the amount of calcium and/or magnesium ions incorporated into the dough with the gluten-chelating agent complex should be carefully controlled to avoid imparting excessive and non-desirable toughening properties to the dough. The amount to be added to give the desired beneficial effects while avoiding excessive toughening may easily be determined by simple tests. In any event, the time required to effect toughening of the dough to the extent that it becomes unworkable is relatively long and the necessary working of the dough prior to baking is able to be completed and the bread product produced therefrom found satisfactory.

It is worth noting however, that gluten-Group II complexes, and in particular the citrates, are found to have no deleterious effects on the dough mix. Hence, additional calcium or magnesium ions are found to give no advantage and the addition thereof to the dough is totally unnecessary, provided that the dough water is not excessively soft.

The powdered gluten-chelating agent complex of the present invention may in general replace or supplement regular vital gluten or modified glutens in most applications. However, since it disperses rapidly and rehydrates, and then becomes developed, in a very short time its greatest potential is in areas where such qualities are essential or highly desirable. In particular, it may be used to great advantage in short time baking processes.

In a further aspect of the present invention there is provided a short time baking process which comprises incorporating along with the standard dough ingredients flour, shortening, sugar and salt and an effective amount of a gluten-chelating agent complex.

Briefly, a short time baking process involves mixing the ingredients of a dough formulation, developing the dough by mechanical working or by a chemical dough development procedure, proofing the developed dough and finally baking the proofed dough.

The amount of complex included in the formulation may be up to 3 percent, preferably from 1 to 2 percent, by weight based on dry flour when improvement in baking properties is desired. However, if protein enrichment of the product is required the amount may be much higher, for example, between 10 and 20 percent by weight based on dry flour.

The present invention will be described further with reference to the following preparations and examples directed to the detailed preparation of, and use of, the gluten-chelating agent complexes of the present invention but are not to be construed as placing any limitations on the scope of the present invention, this being defined by the appended claims.

PREPARATION

Preparation of Gluten-Sodium Citrate (1.5%) Complex

1. From Fresh Wet Vital Gluten a. Laboratory or Batch Procedure

A solution comprising 2 g sodium citrate in a minimum of water was introduced into a standard laboratory farinograph bowl which contained 400 g of freshly prepared wet vital gluten and mixing was effected at 200 r.p.m. for 5 to 7 minutes, i.e., until the curve had levelled off. The product was thinly spread onto a suitable surface and freeze-dried overnight. The resulting dry product having a moisture content of from 2 to 4 percent by weight, was reduced in a mill so that the desired gluten-sodium citrate (1.5%) complex, i.e., containing 1.5% by weight based on dry gluten, of sodium citrate, was obtained as a powder which passed a 60 mesh screen.

b. Continuous Commercial Process

The modified gluten of the present invention may be conveniently produced by a simple modification of the well known processes used to separate starch and gluten from wheat flour illustrated by the following scheme:

Wheat flour dough is introduced to a starch/gluten separator and the wet gluten so obtained is passed through a gear pump to a ring drier.

To produce the modified gluten of the present invention it is merely necessary to introduce the chelating agent, say sodium citrate, in solution into the gear pump from a tank via a metering device. The mixing obtained by the action of the gear pump is sufficient to thoroughly mix the wet gluten and the chelating agent and the mixture is then passed to the drier and finally to a hammer mill, where it is reduced to a powder which passes a 80 mesh screen, and subsequently bagged for shipment.

(The chelating agent solution may be introduced at another location in the process, for example, upstream of the pump or even downstream thereof if steps are taken to ensure adequate mixing at a later stage.)

Obviously, the flow rates of wet gluten and chelating agent solution are controlled to provide the desired concentration of chelating agent in the product. For example, about 250 lb/hr of dry powdered gluten-sodium citrate (1.5%) complex according to the present invention is produced by passing 750 lb/hr fresh wet vital gluten (equivalent to 250 lb/hr dry gluten) directly from the separator through the gear pump mixer while introducing into the gear pump 13.0 lb/hr of a sodium citrate solution having a concentration of 3.5 lb/imp. gal of sodium citrate. The so-obtained product had a moisture content of about 5% by weight.

2. From Dry Vital Gluten a. Gluten-Sodium Citrate (1.5%) Complex

A mixture comprising 150 g of dry vital gluten and 250 ml of water containing 2 g of sodium citrate were mixed in a standard laboratory farinograph, fitted with the large bowl, at 200 r.p.m. for 5 to 7 minutes, i.e., until the curve levels off. The resulting material was freeze-dried in the usual manner and ground to give the desired product as a powder, which had a particle size such that it all passed a 80 mesh screen, and had a moisture content of 2 to 4 percent by weight.

b. Gluten - Sodium (Na) - E.D.T.A. Complex

As previously explained, with a Group I chelating agent such as Na-E.D.T.A. it is necessary to adjust the pH of the gluten/chelating agent mixture to the effective pH of the chelating agent.

For example, 250 g of a dry powdered gluten - Na E.D.T.A. (1.5%) complex was prepared by dissolving 2.25 g of Na E.D.T.A. in a mixture of 150 ml water and 100 ml of 5% ammonium hydroxide solution, 150 g dry vital gluten was added with stirring to the solution and the whole mixture transferred to a farinograph and mixed for 7 minutes at 200 r.p.m. The wet complex product so obtained was freeze-dried and ground to a powder, having a moisture content of about 3% and which passed a 80 mesh screen in the usual manner. It is pointed out that the drying step removed the ammonia from the product, the pH of which was thereby reduced to the desired value of 6.

The amount of base required is easily determined practically by simply adding base to a wet mixture of the complex components. For example, in the above case the Na E.D.T.A. powdered vital gluten and 250 ml were mixed on a farinograph, 5% ammonium hydroxide being added portionwise until the known effective pH of 9.5 was attained, by which time 100 ml of the ammonium hydroxide has been added. Since the required water content was 250 ml. 100 ml of the water was replaced by 100 ml of the ammonium hydroxide. The same general procedure may be used in respect of any other chelating agents having an effective pH differing from that of regular vital gluten, i.e., about 6.

EXAMPLES

EXAMPLE 1

The superior functionality of the modified gluten product of the present invention was demonstrated by comparison with ordinary vital gluten in a short time bread making test.

The formula used was as follows:

| | | |
|---|---|---|
| Flour | 100 | |
| Shortening | 3 | |
| Yeast | 4 | |
| Sugar | 4 | |
| Protease preparation | 0.5 g | (50,000 H.U. units per 2 oz.) |
| Salt | 2 | |
| Ascorbic acid | 60 ppm | |
| Cysteine | 12½ ppm | |
| Potassium bromate | 60 ppm | |
| Gluten - vital or modified as the case may be | 2 | |

Procedure

The gluten in dry form is introduced along with the other dough components into the bowl (McDuffee) of a Hobart model C-100 and mixed for 30 seconds on low and 2 minutes on high (3rd speed). After 10 minutes floor time, the dough was scaled at 275 g; rounded by hand 20 times and rested for 10 minutes. Subsequently, it was sheeted and moulded mechanically using a standard 1 pound bread size pan (top dimension 8½ × 4½; bottom dimension 7½ × 3½; height 2¾): proofed for 90 minutes at 110° F and baked for 20 minutes at 425° F. After cooling for 1 hour, it was weighed, the volume measured by the standard rape seed displacement test and finally cut and scored. In the following, the data given is the mean obtained from at least two evaluations.

As will be noted from the various time periods utilized, especially the proof time, the test is deliberately made more severe than would be experienced in a normal short time baking procedure in order to fully evaluate and compare the various materials.

Part A

The above procedure was used to evaluate the effect of various concentrations of chelating agent, namely, sodium citrate, in the gluten-chelating agent complex, on the quality of bread produced. The comparison included control samples of vital gluten obtained from two different wash separated processes and gluten-citrate complexes produced from said vital glutens. The results are given in terms of loaf volume obtained in bread produced by the above procedure.

| | Control 0 | Concentration, weight percent based on dry gluten of sodium citrate in gluten-citrate complex | | |
|---|---|---|---|---|
| | | 1.0 | 1.5 | 2.0 |
| Gluten A | 9.2 | 9.5 | 9.8 | 9.9 |
| Gluten B | 9.0 | 9.4 | 9.6 | 9.5 |

The internal structure in each case was found to be similar and satisfactory.

The results clearly demonstrate the significant increase in functionality of the gluten-citrate complexes according to the present invention compared with ordinary vital gluten. Moreover, significant improvements are evident at 1.0% sodium citrate concentration whilst a sodium citrate concentration of about 1.5% was found to give best results.

Part B

The procedure of Part A was repeated using a gluten-ammonium phosphate complex and a gluten-sodium citrate complex, again including a vital gluten control, the results being as shown in the following table:

| Sample | | Concentration in weight percent based on dry gluten, of chelating agent in gluten-chelating agent complex | | | | |
|---|---|---|---|---|---|---|
| | | 0 Control | 1.0 | 1.5 | 2.0 | 3.0 |
| Gluten - | ammonium phosphate | 9.2 | 9.9 | 10.1 | 10.3 | 9.5 |
| Gluten - | sodium citrate | 9.2 | 10.0 | 10.2 | 10.0 | 9.3 |

The internal structure in each case was similar and satisfactory.

These results demonstrate the superior functionality of the modified gluten of the present invention over regular vital gluten. Again, the optimum concentration of chelating agent in the complex is found to be about 1.5% by weight based on the dry gluten.

Part C

The procedure of Part A was repeated using a gluten - Na E.D.T.A. complex, but this time using a strong bakers straight grade flour, the results being as follows:

| | Control 2% v.g. | Concentration, in weight percent based on dry gluten of E.D.T.A. in the gluten - E.D.T.A. complex | | | |
|---|---|---|---|---|---|
| | | 0.75 | 1.0 | 1.4 | 1.8 |
| Loaf Volume | 9 | 8.7 | 9.5 | 10.0 | 9.8 |

The internal structure in each case was similar and satisfactory.

The above data shows that the product of the present invention can be used to advantage even when relatively strong flours are being used and confirms the optimum concentration of agent in the complex to be about 1.5%.

Part D

The pH adjustment procedure described in paragraph 2(b) on page 17 was used to produce various gluten - Group I chelating agent complexes which were evaluated using the baking process described above. In all instances the complex product of the present invention was used at the 2% level based on the weight of (bakers patent) flour. Also includes in each dough formulation at a level of from 100 to 150 ppm were calcium ions (in the form of calcium chloride. The bread produced was evaluated, as previously, by loaf volume.

Results:

| Sample | Specific Volume |
|---|---|
| Control | 8.5 |
| Regular vital gluten | 8.8 |
| Gluten - E.D.T.A. (1.5%) complex | 9.9 |
| Gluten - sodium phytate (1.5%) complex | 9.6 |
| Gluten - calcium phytate (1.5%) complex | 9.5 |
| Gluten - potassium phosphate (1.5%) complex | 10.1 |
| Gluten - sodium phosphate (1.5%) complex | 10.0 |
| Gluten - ammonium phosphate (1.5%) complex | 10.1 |
| Gluten - disodium pyrophosphate (1%) complex | 9.9 |
| Gluten - sodium hexametaphosphate (1%) complex | 9.8 |
| Gluten - sodium tripolyphosphate (1%) complex | 9.9 |

The crumb was satisfactory in all cases and the increased functionality provided by the complexes of the present invention compared to flour alone and regular vital gluten is clearly evidenced by the increased loaf volumes obtained.

In order to demonstrate the importance attached to the adjustment, where necessary, to the effective pH of the chelating agent, included in the above evaluations was the product formed by mixing regular vital gluten and Na E.D.T.A. under the same conditions as for the above gluten - Na E.D.T.A. (1.5%) sample but with no adjustment in the pH of the gluten - Na E.D.T.A. mix, which was found to be about 6. Bread produced in the same manner as previously but using this product was found to have a loaf volume of only 8.7, i.e., about the same as when normal vital gluten is used and not significantly more than the control.

EXAMPLE 2

The improved rate and capacity of absorption of water by the modified gluten of the present invention was demonstrated by comparison with various commercially available materials, the materials included in the comparison being as follows:

1. Patent flour as control;
2. Patent flour supplemented with 2% of a gluten-sodium citrate (1.5%) complex, i.e., containing approximately 1.5% by weight of sodium citrate;
3. Patent flour supplemented with 4% of a gluten-sodium citrate (1.5%) complex;
4. Patent flour supplemented with 2% of a commercially available modified gluten;
5. Patent flour supplemented with 4% of a commercially available modified gluten;
6. Patent flour supplemented with 2% of vital gluten;
7. Patent flour supplemented with 4% of vital gluten.

All the above percentages are by weight based on the dry flour.

The test samples were mixed in a standard laboratory farinograph and water absorption adjusted to bring the consistency of the doughs to the 500 B.U. line.

Results

| Sample | % Absorption | Time to[1] Peak |
|---|---|---|
| 1 | 63.0 | 3.5 |
| 2 | 64.3 | 4.4 |
| 3 | 66.0 | 5.5 |
| 4 | 63.3 | 3.0 |
| 5 | 64.0 | 3.7 |
| 6 | 63.3 | 6.0 |
| 7 | 64.0 | 6.0 |

[1]Time in minutes for the curve to each maximum consistency.

The above data demonstrates that the chemically modified gluten of the present invention has water absorbing properties superior to regular dry gluten and prior art modified gluten and these properties are of obvious significance in most baking applications.

EXAMPLE 3

The evaluation procedure described in Example 2 was used to evaluate the effect on bread quality of incorporating varying amounts of the gluten-sodium citrate (1.5%) complex in the bread dough. As a comparison, patent flour and patent flour supplemented with normal vital gluten were treated in the same manner. The results, expressed as bread volumes, are as follows:

| | Bread Volume |
|---|---|
| Patent flour control | 8:1 |
| Patent flour supplemented with 2% normal vital gluten | 8:4 |
| Patent flour supplemented with 1% gluten-sodium citrate complex | 8.6 |
| Patent flour supplemented with 2% gluten-sodium citrate complex | 9.2 |

The above percentages are by weight based on the dough flour content.

The internal structure in each case was similar and satisfactory.

The above data clearly illustrates the significant improvements in loaf volume obtained by use of the product of the present invention.

In particular, the results show that the gluten-sodium citrate (1.5% level) product of the present invention is more than equivalent to twice the amount (by weight) of normal vital gluten, and that weight for weight the product of the present invention has greatly superior functionality when compared with normal vital gluten.

EXAMPLE

The following test was developed to evaluate, comparatively, the extent of protein development in a dough to which has been added a gluten-chelating agent complex of the present invention. The formula used is as follows:

| | |
|---|---|
| Bakers 2nd patent flour | 135 g |
| Salt | 1 g |
| Water | 90 ml |
| Gluten product | 15 g |

The object is to form a dough which is then pinned, under set conditions, until it starts to tear, at which point the thickness of dough is measured. The thickness of the dough is considered to be a measure of the development of the protein in the dough, the thinner the sheet of dough at tear the more developed the protein.

Procedure

The salt is dissolved in the water and added to a blend of the gluten and flour. The mix is mixed for 2 minutes in a Swanson mixer (equivalent to about 2.5 min. on 3rd speed in a Hobart C-100). The mixture is then covered with a plastic film to prevent drying out and rested for 10 minutes, after which it is dusted with corn starch and passed twice through sheeting rolls having about a 3 mm spacing. After covering and resting for a further 10 min., it was dusted again and pinned out. The resting and pinning is then repeated until the layer of dough commences to tear. The thickness at tear is measured using a micrometer.

Results

| Gluten Product in Dough | Thickness at Tear |
|---|---|
| Regular vital gluten | 0.4 mm |
| Gluten-sodium citrate (1.5%) complex | 0.25 mm |

The above data demonstrates that the complex of the present invention presumedly by its ability to hydrate rapidly, is also developed rapidly and to a far greater extent than regular vital glutens.

This property indicates an ability of the novel complex to advantageously augment the network of indigenous protein in a flour.

A more severe version of the above test was also effected wherein the pinned out doughs, at or near the point of tear, were cut into strips, 4 × 18 inches. One person gripped each end of the strips manually and proceeded to gently draw out the strip even further. This resulted in a further reduction in the thickness of the strip, the thickness at tear being measured again.

Results

| Gluten Product in Dough | Thickness at Tear |
|---|---|
| Regular vital gluten | 0.25 mm |
| Gluten-sodium citrate (1.5%) complex | 0.15 mm |

This data confirms the conclusion arrived at previously, that is, the products of the present invention hydrate rapidly and produce well developed doughs in a far shorter time than regular vital gluten.

EXAMPLE 5

In this example the baking qualities of a modified gluten of the present invention were evaluated in a chemical dough development (C.D.D.) baking process for the production of commercial white enriched pan bread.

The formula used was a standard commercial white sliced enriched pan bread and the only variables were the flours used which were as follows:

| | |
|---|---|
| Control 1 | Spring wheat bakers patent flour containing 12% protein |
| Control 2 | Control 1 diluted with 50% soft wheat biscuit flour to give 10.5% protein |
| A | Control 2 supplemented with 2% regular vital gluten to give 12% protein |
| B | Control 2 supplemented with 2% gluten-sodium citrate (1.5%) complex according to the present invention to give 12% protein |

Process

The baking process was a standard C.D.D. process utilizing no bulk fermentation period. The bread so produced was subjected to the rape seed displacement test to determine bread volume, and the crumb evaluated after slicing.

Results

In all cases the crumb structure was fine and even; the remaining data is summarized in the following table.

| | Control | | | |
|---|---|---|---|---|
| Test | 1 | 2 | A | B |
| Dough Absorption | 62% | 58% | 61% | 61% |
| Proof Height | 13.5 cm | 12.9 cm | 13.4 cm | 14.0 cm |
| Volume (24 oz loaf) | 4850 cc | 4200 cc | 4450 cc | 4800 cc |
| Specific volume (cc/gm) | 7.2 | 6.2 | 6.6 | 7.2 |

This data again demonstrates the superior functionality of the products of the present invention in that the addition of 2% of the novel complex to the weak flour (control 2) so augments the indigenous protein that the so-supplemented flour has baking characteristics almost identical to the strong flour control 1. This contrasts with the results obtained by the use of an equal amount of regular vital gluten which shows that, whilst having some beneficial effect, as might well be expected, the vital gluten does not as readily hydrate or develop and the improvement in baking properties is seen to be significantly inferior.

EXAMPLE 6

This example illustrates the performance of regular vital gluten and the gluten-sodium citrate (1.5%) complex in the production of Hearth Bread. The formula used was a standard commercial hearth (French) crusty bread formula having a lean dough containing 1.5% of sugar and 1.5% fat based on the weight of flour. The flours evaluated were as follows:

| | |
|---|---|
| Control | Bakers grade flour containing standard C.D.D. additives: protein content 13% |
| Prior Art A | Control supplemented with 2% regular vital gluten to give 14.5% protein |
| Invention B | Control supplemented with 2% gluten-sodium citrate (1.5%) to give 14.5% protein |

The process used was a standard C.D.D. process involving slow speed mixing and no bulk fermentation. The bread produced was evaluated in the usual manner and gave the following results:

| Test | Control | A | B |
|---|---|---|---|
| Dough Absorption | 60% | 63% | 63% |
| Loaf Volume (24 oz) | 4925 cc | 5200 cc | 5550 cc |
| Specific Volume (cc/gm) | 7.25 | 7.65 | 8.16 |

The crumb in each case was satisfactory. The data illustrates, via significantly improved loaf volumes, the superior functionality of the complex of the present invention over vital gluten. This test is very significant since breads of this type are processed without the dough being supported (by a par) and it is therefore usually necessary to use strong flours to make such bread. However, as can be seen from the above data, the weaker flour (control 2) is supplemented with 2% of the gluten-sodium citrate complex of the present invention, has greatly improved baking properties which in fact are substantially the same as those of the strong flour (control 1).

EXAMPLE 7

The performance of the gluten-sodium citrate (1.5%) complex of the present invention in a modified C.D.D. commercial formula was evaluated. The formula used being as follows:

| | | |
|---|---|---|
| Bakers second patent | 400 | Parts |
| Yeast | 12 | " |
| Sugar | 16 | " |
| Shortening | 12 | " |
| Milk | 8 | " |
| Delquik* | 2 | " |
| Delpromase** | .5 | " |
| Water | 274 | " |
| Product A or B see below | 4 | (equivalent to 1% by weight based on the flour) |

*A C.D.D. process additive obtainable from Delmar Chemicals Limited of Montreal, Canada.
**A commercial protease mixture available from Delmar Chemicals Limited of Montreal, Canada.

The variations effected for comparison purposes were:

| | |
|---|---|
| Control | No Gluten |
| A | Commercially available modified gluten |
| B | Gluten-sodium citrate (1.5%) |

A standard C.D.D. baking procedure was followed using laboratory equipment, the doughs being scaled to give 20 oz loaves after baking.

Results

In each case, the loaf produced had an even crumb.

| | Control | A | B |
|---|---|---|---|
| Volume | 4050 cc | 4250 cc | 4500 cc |
| Specific volume | 7.1 | 7.5 | 8.1 |
| Height | 11.9/15.2 | 12.3/15.6 | 12.4/16.0 |

The above data clearly shows even at the 1% level that the product of the present invention is effective and a significant improvement in C.D.D. processes over commercially available modified gluten.

The above test was repeated on a commercial scale using a standard commercial formulation which was as follows:

| | Gr |
|---|---|
| Glenora W. Flour | 500 |
| Water | 315 cc |
| Sugar | 10 |
| Cerelose | 10 |
| Salt | 10 |
| Whey Powder | 20 |
| Shortening | 15 |
| Yeast | 15 |
| Delquik 70 MS | 2.5 |
| Calcium propionate | 1.25 |
| GMS 90 (emulsifier) | 2.5 |
| Commercially available modified gluten, or gluten-sodium citrate (1.5%) complex | 5 |

Procedure

This was a standard C.D.D. baking procedure.

The loaves were evaluated in the usual manner. There were no differences in crumb structure, both loaves having a fine crumb but the volume of the loaf formed using the gluten-citrate complex was found to be greater than that obtained using commercially available modified gluten.

EXAMPLE 8 a. Mode of Mixing of Complex Components

The effect of the mode of mixing of the gluten and the chelating agent was evaluated by forming the same gluten-sodium citrate (1.5%) complex by two very different methods of mixing, namely, the farinograph (A) and the gear pump (B) methods. In each case the mix used was 400 g of wet vital gluten and 2 g of sodium citrate which after being mixed was freeze-dried and ground in the usual manner. The products were evaluated using the previously described baking procedure (see Example 1, again at the 2% level) and the bread produced being evaluated by loaf volume and crumb score.

Results

| Mixing Method | Specific Volume | Internal Structure |
|---|---|---|
| A | 8.80 | excellent |
| B | 8.85 | very good |

This data strongly indicates that the specific mode of mixing the complex components is not critical since the products are very similar as regards baking making properties.

b. Influence of Temperature on Mixing Step

Using the farinograph as mixer and the material as used in (a) the effect of mixing the complex components at 30° and 40° C was determined. It was found that loaves produced from the complex produced at these two temperatures had equal specific loaf volume of 8.4 whilst the internal structure was excellent in the first case and very good in the second case.

The conclusion therefore is that the temperature of mixing is not critical.

c. Comparison of a Gluten-Chelating Agent Complex of the Present Invention Prepared by Various Methods A gluten-sodium citrate (1.5%) complex was prepared by the various procedures listed generally below (and in more detail in other examples) and the product evaluated by the usual bread making method (see Example 1; again at the 2% level).

| Procedure | | | |
|---|---|---|---|
| Mixing | Drying | Grinding | Specific Loaf Volume |
| Farinograph | Freeze-dried | Hammer mill | 9.4 |
| Gear pump | Freeze-dried | Hammer mill | 9.4 |
| Gear pump | Commercial air drying (ring drier) | Hammer mill | 9.4 |
| Control - Vital Gluten Farinograph | Freeze-dried | Hammer mill | 8.5 |

The above data confirms the improved functionality of the complex of the present invention compared to regular vital gluten. It is noteworthy and, surprising that the drying conditions of the commercial ring drier which are relatively severe compared to the freeze drying conditions do not seem to affect the product since both laboratory and commercially prepared samples of the product are virtually identical.

EXAMPLE 9

The previous examples illustrate the advantages to be obtained using the complex of the present invention in chemical dough development short time processes.

A product of the present invention, namely, the gluten-sodium citrate (1.5%) complex was included in a typical bread flour formulation which was used to make bread via the Chorleywood Baking Process (CBP). For comparison purposes, several types of regular vital gluten were treated in the same manner. Two evaluations were carried out, one at about 2% by weight and the other at about 15% by weight addition of gluten product based on dry flour.

Results

It was found that, at the lower level, all the flour/gluten product combinations made acceptable bread but the gluten-citrate complex of the present invention gave a whiter and slightly finer and very even crumb than the other products.

At the higher level, the gluten-citrate complex produced the largest bread which was also found to have the finest and most even crumb.

EXAMPLE 10

Effect of varying the concentration of citrate in the modified gluten of the present invention French bread was prepared as follows:

(a) Dough Formulation

| | | |
|---|---|---|
| Flour (50:50 ZF plus and Glenrose with premix*) | | 500 g |
| Yeast | | 12.5 g |
| Salt | | 7.5 g |
| Sugar | | 7.5 g |
| Shortening | | 7.5 g |
| Water | | 255 ccs. |
| Gluten | (a) regular vital gluten | 10 g |
| | (b) modified gluten of invention | (+ 15 ccs water) |

*Delquick

The control therefore contained no gluten; the comparison contained 2% normal vital gluten and the invention samples 2% of normal vital gluten modified by treatment with varying amounts of sodium citrate.

Procedure

1. The dough components were mixed at slow speed for 1 minute and then 3 minutes at medium speed; i.e. 4 minutes in all;
2. The resulting dough was allowed to rest for 10 minutes;
3. The dough was then scaled in a mould at 390 g;
4. Rested for a further 25 minutes;
5. Proofed at 107° for between 60 and 70 minutes; and finally
6. Baked at 430° for 20 minutes.

Two samples were evaluated at each level and the loaf volume and thereby the specific volume, evaluated in the usual manner.

Results

| Sample | Specific Volume |
|---|---|
| Control (no gluten) | 4.6 |
| (a) Normal vital gluten | 5.25 |
| (b) Modified gluten containing | |
| 0.5% sodium citrate | 5.4 |
| 1.0% sodium citrate | 5.3 |
| 1.5% sodium citrate | 5.3 |

The above results indicate that the amount of citrate present in the modified gluten according to the present invention is effective even at lower levels. In the above evaluations, the best results are obtained when the sodium citrate constitutes only about 0.01% of the dough formulation.

EXAMPLE 11

The dispersability in water of the gluten-sodium citrate (1.5%) complex of the present invention was compared with that of regular vital gluten and commercially available modified gluten.

Procedure 10 g of the gluten product were stirred in 15 ml of water contained in a beaker and the characteristics of the wet product evaluated immediately after reconstitution.

Results

It was found that regular gluten showed substantially no cohesion or formation of gluten strands and the presence of free moisture was evident. The commercially available modified gluten became paste-like with no gluten strands. The gluten-citrate complex immediately formed a gluten ball with good, if slightly tight extensibility.

In a further test, it was found that the same gluten-sodium citrate complex became completely dispersed and formed a relatively stable dispersion in about 6 seconds whereas frozen wet gluten under the same conditions took about seven times as long.

COMPARISON EXAMPLE

Experiments were conducted to illustrate that the product of the present invention cannot be obtained if the vital gluten and chelating agent, namely, the preferred sodium citrate, are in the dry state.

In the following, two samples of vital gluten were employed, namely, Canadian (C) and Australian (A) vital wheat gluten samples. The sodium citrate was dry blended into the dry gluten at the 1½ % by weight level based on the weight of gluten. The mixtures so formed were then made subject of a baking test. The baking test involved the use of an established commercial method for producing 20 oz loaves of bread. The formula used was as follows:

| | |
|---|---|
| Glenrose flour ⎤ | |
| Gluten      ⎦ | 100% |
| Salt | 2% |
| Sugar | 4% |
| Milk | 2% |
| Shortening | 3% |
| Yeast | 3% |
| Delquik | .5% |
| Water | — |

The Glenrose/gluten combinations tested were as follows:

| | | |
|---|---|---|
| a) | 100% | Glenrose (control) |
| b) | 96% | Glenrose |
| | 4% | Vital wheat gluten (C) |
| c) | 96% | Glenrose |
| | 4% | Vital gluten (C) + sodium citrate |
| d) | 96% | Glenrose |
| | 4% | Vital gluten (A) |
| e) | 96% | Glenrose |
| | 4% | Vital gluten (A) + sodium citrate |
| f) | 96% | Glenrose |
| | 4% | Gluten/sodium citrate (1½%) product of the present invention |

BAKING PROCEDURE

The same procedure was used in each evaluation: in particular, each dough was mixed for 1 minute slow and 2 minutes medium (on a Hobart mixer);

all flours containing gluten had the same water absorption;

each dough was proofed to height in a time of 100 to 110 minutes and subsequently baked for the same period of time.

It was found that doughs made with sodium citrate added separately were stickier after mixing, more extensive and generally smaller in proof height.

| RESULTS | a | b | c | d | e | f |
|---|---|---|---|---|---|---|
| Proof height | 4¼" | 4¼" | 4" | 4¼" | 4" | 4⅜" |
| Volume (cc) | 3500 | 3725 | 3850 | 3850 | 3850 | 4100 |
| Specific vol. | 6.2 | 6.65 | 6.87 | 6.87 | 6.87 | 7.32 |

Note* - Variations in specific loaf volumes of 0.2 or more are considered significant.

CONCLUSION

It can be seen from the above results that the loaves baked using a dry blended mixture of vital gluten and sodium citrate had a significantly smaller loaf volume than the loaves produced using the product of the present invention.

Although the present invention has been illustrated by reference to specific embodiments thereof, it will be understood that modifications and variations may be employed without departing from the spirit and scope of the invention as those skilled in the art will readily understand. Such modifications and variations are therefore considered to be within the preview and scope of the appended claims.

What we claim is:

1. A short-time baking process which comprises mixing the ingredients of a dough formulation, subjecting the dough formulation to mechanical working until the dough formulation is developed or to chemical dough developing, proofing the dough and baking the dough, the improvement comprising incorporating into said dough formulation up to and including 20 percent by weight, based on dry flour, a dry powder composition comprising vital gluten modified by reaction with up to 5 percent by weight, based on dry gluten, of a non-toxic chelating agent.

2. The process according to claim 1 wherein said chelating agent is 0.5 to 3 percent by weight, based on dry gluten, citric acid or a non-toxic alkali metal salt thereof, and said composition has a moisture content of less than 8 percent.

3. The process according to claim 2 wherein up to 2 percent by weight, based on dry flour, of said composition is incorporated into the dough formulation.

4. The process according to claim 2 wherein said chelating agent is 1.25 to 2 percent by weight, based on dry gluten, sodium citrate, and said composition has a moisture content of from 4 to 6 percent.

5. The process according to claim 1 wherein calcium and/or magnesium ions are incorporated into said dough formulation.

* * * * *